Sept. 14, 1965  J. H. KETTERING ETAL  3,205,980
RAILWAY CAR WHEEL TREAD BRAKE APPARATUS
Filed Aug. 23, 1963
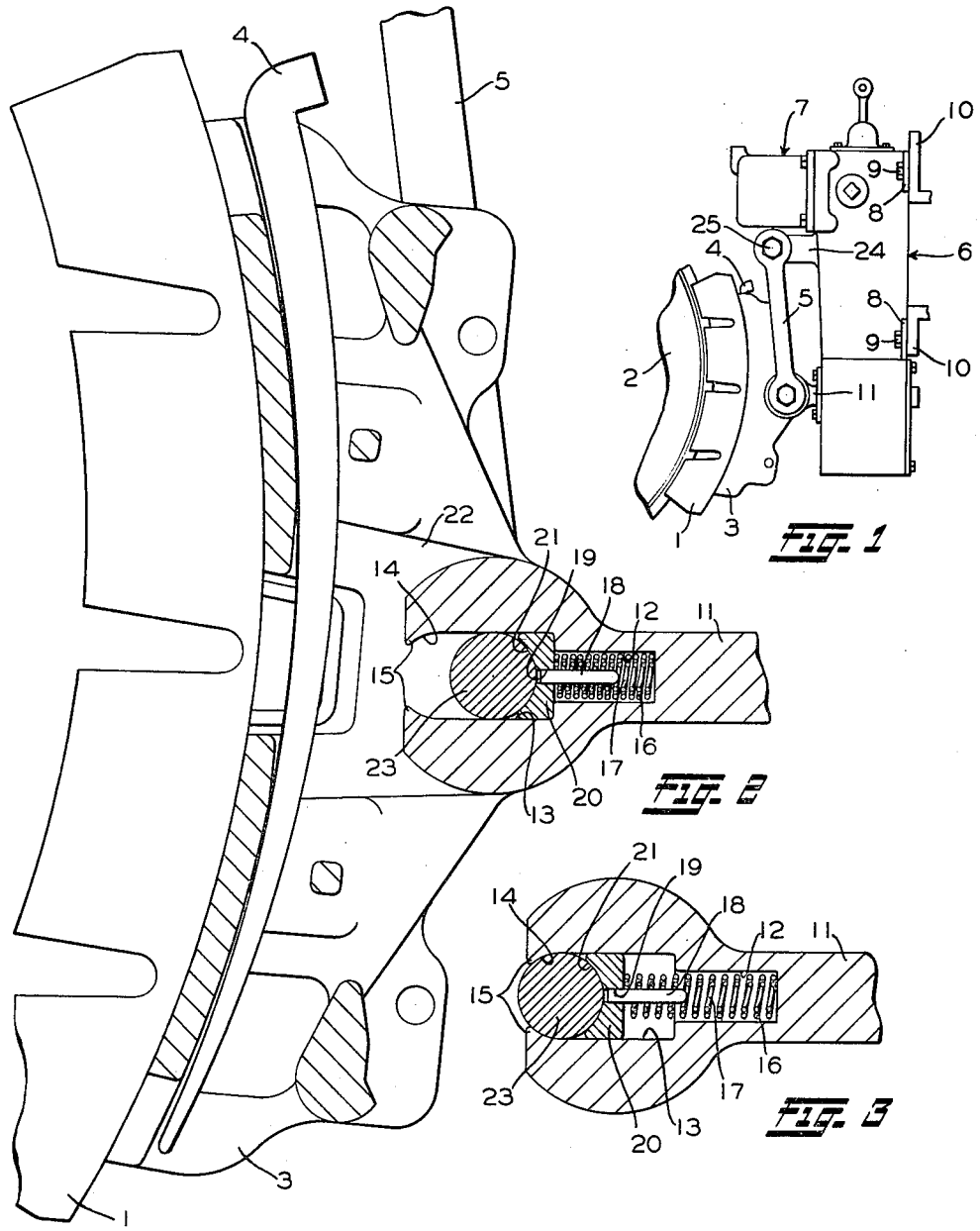
INVENTORS
James H. Kettering
BY Earl E. Allan
Attorney

United States Patent Office 3,205,980
Patented Sept. 14, 1965

3,205,980
RAILWAY CAR WHEEL TREAD BRAKE
APPARATUS
James H. Kettering, Irwin, and Earl E. Allan, Monroe Heights, Pitcairn, Pa., assignors to Westinghouse Air Brake Company, Wilmerding, Pa.
Filed Aug. 23, 1963, Ser. No. 304,015
5 Claims. (Cl. 188—219.6)

This invention relates to tread brake apparatus for railway rolling stock and more particularly to tread brake apparatus of the "package" type wherein the entire mechanism is self-contained and installable and removable as a unit on the truck frame.

Until recently, conventional brake riggings for railway cars consisted of one or more brake cylinders carried on the underside of the car body and having the piston rods thereof connected through rods and levers to the brake shoes, independently hung on brake shoe hangers from the truck frame, to effect movement of all of the brake shoes on the car into and out of contact with the tread of the car truck wheels.

The conventional type of brake rigging cannot conveniently be employed on certain new type cars, such as the new lightweight cars, due to limitations of space and weight requirements. Consequently, more recently there has been proposed for use on railway cars, such as subway cars, a brake rigging of the "package" type wherein a self-contained brake assembly is provided for each individual wheel on the car. A brake assembly of this type is described and claimed in Patent No. 2,940,554, issued June 14, 1960, to Mortimer B. Cameron and assigned to the assignee of this application.

It has been found that "package" brake assemblies are subject during winter weather to the collection of ice and snow which interferes with the proper movement of the brake shoe into direct frictional contact with the tread of the wheel, thereby in some instances interfering with a quick and full brake application when desired.

One method that has been tried on certain railroads to prevent the collection of ice and snow on brake assemblies of the "package" type has been to maintain a sufficiently low fluid pressure in the brake cylinder so that a light brake application is in effect while the train is traveling along the track without exerting an appreciable retarding or braking force, the purpose of the light brake application being to generate, by the friction of the brake shoe against the tread surface of its corresponding wheel, sufficient heat to produce a rise in the temperature of the brake shoe and the peripheral portion of its corresponding wheel to such a temperature as to prevent the accumulation of ice and snow thereon. However, it has been found in actual practice that the small degree of pressure required in the brake cylinder of the "package" type brake assembly necessary to press the brake shoe against the tread surface of its corresponding wheel with sufficient force to generate the required amount of heat to prevent the accumulation of ice and snow on the brake shoe and wheel is not sufficient to press the periphery or skirt portion of the packing cup that is secured to the piston of the brake cylinder against the wall of the bore in the brake cylinder with the degree of force necessary to effect a fluid pressure seal between the skirt portion and the wall of the bore. Consequently, a considerable quantity of fluid under pressure leaks past the skirt portion of the packing cup so that the pressures on the opposite sides of the piston tend to equalize and thus create a condition which, it is apparent, is most undesirable, for, upon equalization, the brake shoe is no longer pressed against its corresponding wheel for the purpose of generating heat to prevent the accumulation of ice and snow thereon.

Accordingly, it is the general purpose of this invention to provide a novel "package" type wheel tread brake assembly having biasing means effective independently of and without fluid pressure existing in the brake cylinder for pressing the brake shoe of the brake assembly against the tread surface of its corresponding wheel with a light force which is adequate to generate sufficient heat to produce a rise in the temperature of the brake shoe and the tread surface of its corresponding wheel to such a temperature as to prevent the accumulation of ice and snow thereon and thereby insure the obtaining of a proper brake operation when called for.

This invention comprises a novel yieldable spring-biased connection between the brake rod and the brake head of a "package" type brake assembly.

The novel yieldable spring-biased connection of this invention embodies a pair of concentric compression type of springs disposed in a bottom bore formed in the brake head end of the brake rod and interposed between the inner end of the bottom bore and one side of a follower member slidably mounted in a rectangular slot formed in the brake rod and provided on its opposite side with a semi-circular concave cavity for receiving a bolt that extends through the rectangular slot and two spaced-apart jaws formed integral with the back of the brake head and disposed on opposite slides of the brake head end of the brake rod for securing the brake head to the brake rod. This compression type of spring operates, while fluid under pressure is released from the brake cylinder of the "package" type brake assembly, to bias the brake shoe carried by the brake head against the tread surface of the corresponding wheel with a chosen force whereby the friction between the brake shoe and the wheel generates sufficient heat to insure that the brake shoe and the wheel are warm enough to prevent the accumulation of ice and snow thereon during the time that a train is running with the brakes released.

In the accompanying drawing:

FIG. 1 is a side-elevational view of a brake assembly embodying the invention, showing the manner by which the assembly is mounted on a railway passenger car truck.

FIG. 2 is a vertical cross-sectional view of the brake head and brake rod of a brake assembly showing the relative positions these members occupy while fluid under pressure is supplied to the brake cylinder or the assembly for effecting a brake application.

FIG. 3 is a fragmentary sectional view of the brake rod and bolt that secures the brake rod to a brake head showing the relative positions these members occupy while fluid under pressure is released from the brake cylinder or the assembly and the brakes are released.

Description

As shown in FIG. 1 of the drawing, a pneumatic brake assembly, one of which is provided for each wheel of a railway passenger car truck, is secured as by several bolts and nuts to a pair of bosses formed integral with the side frame of the truck.

The brake assembly, as shown in FIG. 1, comprises a brake shoe 1 for movement into braking contact with the tread surface of a wheel 2 of the car truck, a brake head 3 to which the brake shoe 1 is secured as by a key 4, an external brake head hanger 5, and a support member illustrated as a sectionalized casing comprising a main section 6 and a brake cylinder section 7.

Formed integral with the main section 6 is a pair of bosses 8 provided with several spaced-apart bores (not shown) for receiving a like number of cap screws 9 whereby the main section 6 is rigidly secured to a pair of angle brackets 10 attached, as by welding, to a center sill (not shown) of a passenger car truck frame.

The brake cylinder section 7 and a brake applying mechanism within the main casing section 6 may be identical in construction to that of heretofore known "package" type brake assemblies, but a brake actuating rod 11 of novel construction is provided. The end of the brake rod 11, as shown in FIGS. 2 and 3, is provided with a bottom bore 12 that is coaxial with a substantially rectangular slot 13 formed in this end of the brake rod. The substantially rectangular slot 13 and bottom bore 12 are formed or machined in the left-hand end of the brake rod 11 as follows:

First, a bore 14 is drilled in the left-hand end of the brake rod 11, it being noted that the center of the bore 14 is so located that the distance from this center to the left-hand end of the brake rod 11 is less than one-half the diameter of the bore 14. By thus locating the center of the bore 14, the left-hand end of the slot 13 is provided with two oppositely disposed and inwardly extending fingers 15.

Next, the brake rod 11 is placed in a shaping machine in such a position that the cutting tool of the shaping machine will pass through the bore 14. With the brake rod 11 in this position, the shaping machine is operated to cut or mill the slot 13.

After the slot 13 has been milled in the brake rod 11, it is removed from the shaping machine and the bottom bore 12 is drilled therein, it being noted that the diameter of the bottom bore 12 is less than the distance between the ends of the fingers 15 so that the drill used to drill the bottom bore 12 will pass between these fingers when this drilling operation is performed.

After bottom bore 12 and slot 13 have been formed or machined in the left-hand end of the brake rod 13, the right-hand end, which is screw-threaded, is then screwed into an internally threaded sleeve member (not shown) within the main section 6 and by which an operative connection to the brake cylinder is effected.

Thereafter, two concentric coil type springs 16 and 17 are placed within the bottom bore 12.

Next, a guide pin 18 is pressed into the right-hand end, as viewed in FIGS. 2 and 3, of a bore 19 formed in a follower member 20, the height of which is slightly less than the height of the slot 13 and the width of which is substantially the same as that of slot 13. The left-hand end of the follower member 20 has formed or machined therein, as by a milling machine cutter, the diameter of which is substantially equal to the height of the slot 13, a concave cavity 21.

It will be noted that the over-all length of the guide pin 18 and follower member 20 is less than the length of the slot 13. Therefore, the springs 16 and 17 may now be compressed to the position in which they are shown in FIG. 2 by inserting a small rod into the slot 13 and moving the rod in the direction of the right hand until it abuts the right-hand end of the slot 13 after which the guide pin 18 and follower member 20 can be pushed into the slot 13 from either side thereof. Thereafter, the small rod is removed from the slot 13 whereupon the springs 16 and 17 expand and move the guide pin 18 and follower member 20 in the direction of the left hand until the follower member 20 abuts the fingers 15 at the left-hand end of the slot 13.

Now the slotted end of the brake rod 11 is disposed between two spaced-apart jaws 22 formed integral with the back of the brake head 3, only one of these jaws appearing in FIG. 2 of the drawing.

Assuming that the brake shoe 1 has been removed from brake head 3 by removing the key 4, the hereinbefore-mentioned small rod can be inserted between the jaws 22 of the brake head 3 and between the fingers 15 until its end abuts the surface of the concave cavity 21 in the follower member 20.

Thereafter, by exerting a thrust on the small rod in the direction of the right hand, as viewed in FIGS. 2 and 3, the follower member 20 can be moved against the yielding resistance of the springs 16 and 17 to a position in which a bolt or pin 23 can be introduced into a bore in one of the jaws 22, then pushed into the slot 13 and past the left-hand end of the follower member 20, after which the small rod is withdrawn, it being understood that the springs 16 and 17 will now bias the surface of the concave cavity 21 in the follower member 20 against the peripheral surface of the bolt 23.

Subsequent to withdrawal of the small rod, an additional push on the bolt 23 will shove it through a corresponding bore in the other of the jaws 22 on the back of the brake head 3 until the head of the bolt 23 abuts the exterior side of the one jaw 22.

With the bolt 23 thus positioned, a nut (not shown) is now screw-threaded onto the threaded end of the bolt 23 to retain it against removal by vibration or other causes.

After the brake rod 11 is thus pivotally connected to the brake head 3 and brake head hanger 5, the brake shoe 1 is secured to the brake head 3 by the key 4.

*Operation*

Let it be assumed that a pressure chamber (not shown) of the brake cylinder section 7 is devoid of fluid under pressure and release springs (not shown) within the brake cylinder section 7 have moved the brake cylinder piston (not shown) and the brake applying mechanism within the main casing section 6 to a brake release position. As the brake applying mechanism within the main casing section 6 moves to its brake release position, the brake rod 11 is moved in the direction of the right hand and away from the tread surface of the wheel 2. As the brake rod 11 is thus moved away from the tread surface of the corresponding wheel 2 and to its release position in which it is shown in FIG. 3, the springs 16 and 17 are allowed to expand so that these springs maintain the follower member 20, bolt 23, brake head 3, and brake shoe 1 stationary. Consequently, the brake shoe 1 is not moved away from the tread surface of the corresponding wheel 2 but, on the other hand, it is pressed against the tread surface of the wheel 2 with a light force corresponding to the amount that the springs 16 and 17 are compressed when they occupy their expanded position in which they are shown in FIG. 3, in which position these springs are effective through the intermediary of the follower member 20 to bias the bolt 23 against the fingers 15 at the left-hand end of the slot 13. These springs 16 and 17 are so designed that in their expanded position, they are effective to bias the brake shoe 1 against the tread surface of its corresponding wheel 2 with a force that is adequate to generate, by the friction of the brake shoe 1 against the tread surface of its corresponding wheel 2, sufficient heat to maintain the brake shoe 1 and the outer peripheral portion of the wheel 2 at such a temperature as to prevent the accumulation of ice and snow thereon as the result of rain and snow being deposited thereon as a train travels along a track during inclement weather. Consequently, the "package" brake assembly of the present invention as a result of there being no accumulation of ice and snow thereon will operate satisfactorily when a brake application is subsequently made.

In operation, when it is desired to effect a brake application, fluid under pressure is admitted to the pressure chamber within the brake cylinder section 7 whereupon the brake cylinder piston and the brake applying mechanism within the brake cylinder section 7 and main section 6, respectively, operate in the manner of heretofore-known "package" brake assemblies to effect movement of the brake rod 11 in the direction of the left hand from its release position, in which it is shown in FIG. 3, to its applied position, in which it is shown in FIG. 2. This movement of the brake rod 11 is relative to the follower member 20, bolt 23, brake head 3, and brake shoe 1 since the brake shoe 1 is spring-biased against the tread surface of the corresponding wheel 2 by the springs 16 and 17 while the brakes are released. Consequently, as the brake rod 11 is thus moved in the direction of the left hand, the springs 16 and 17 are compressed until the right-hand side of the stationary follower member 20 abuts the right-hand end of the slot 13 in the brake rod 11.

Subsequent to the movement of the brake rod 11 to the position shown in FIG. 2, the thrust applied to the brake rod 11 from the brake cylinder piston through the brake applying mechanism within the main section 6 is transmitted through the intermediary of the follower member 20, bolt 23, and brake head 3 to the brake shoe 1 to exert a corresponding force on the brake shoe 1 while contacting the tread of wheel 2 to effect a braking action thereon.

As the brake head 3 and brake shoe 1 are moved as described above, these members are supported and guided by the brake head hanger 5 as this hanger, which comprises two parallel links disposed respectively on the opposite sides of a bracket 24 (FIG. 1) integral with the main section 6 and suspended therefrom as by means of a bolt 25, is rocked about the bolt 25. The orientation of the brake head hanger 5, the brake head 3 and the brake rod 11 is such that the brake head 3 and brake shoe 1 carried thereby are moved radially toward the wheel 2.

When it is desired to release the brake application, the fluid under pressure supplied to the pressure chamber within the brake cylinder section 7 is vented in the usual manner to atmosphere through a pipe (not shown) that connects the brake cylinder section 7 to the brake controlling valve device of the car brake system, whereupon the force of release springs (not shown) within the brake cylinder section 7 moves the brake cylinder piston and its piston rod in a brake releasing direction to effect, through the mechanism within the main section 6, movement of the brake rod 11 in the direction of the right hand away from the tread surface of the wheel 2 from the position shown in FIG. 2 to the position shown in FIG. 3 to effect a brake release.

As the brake rod 11 is thus moved in the direction of the right hand, the springs 16 and 17 are rendered effective to expand and, through the intermediary of the follower member 20, bolt 23 and brake head 3, maintain the brake shoe 1 in braking contact with the tread surface of the corresponding wheel 2 so that the brake shoe 1 is pressed against this tread surface with a force corresponding to the degree of compression of these springs while they occupy their expanded position in which they are shown in FIG. 3. It will be understood, of course, that this degree of compression is such that the brake shoe 1 is pressed against the tread surface of the wheel 2 with adequate force to insure that sufficient heat will be generated by the friction of the brake shoe 1 against the tread surface of its corresponding wheel 2 to maintain, while the brakes are released, the brake shoe 1 and the outer peripheral portion of the wheel 2 at such a temperature as to prevent the accumulation of ice and snow thereon in the coldest weather of the winter months.

It will be understood that this invention may be applied to or employed in brake assemblies, other than the "package" type with which it is herein illustratively described, wherein the brake shoe or braking element engages wheel braking surfaces other than the tread of the wheel.

Having now described the invention, what we claim as now and desire to secure by Letters Patent is:

1. A brake assembly comprising, in combination:
    (a) a brake head,
    (b) a brake shoe carried by said brake head,
    (c) an actuating rod,
    (d) means providing a lost-motion connection between said actuating rod and said brake head through which in cooperation with said actuating rod a force is applied to and released from said brake head for the purpose of causing said brake shoe to exert a braking force on a braking surface of a rotatable member to be braked or causing the release of such a force, and
    (e) biasing means operatively interposed between said brake head and said actuating rod, said biasing means being compressed upon lost-motion movement of the actuating rod relative to said brake head incidental to application of a braking force to said actuating rod and effective upon lost-motion movement of the actuating rod relative to the brake head incidental to full release of braking force from the actuating rod to exert a biasing force on said brake head to maintain frictional contact of the brake shoe with the rotatable member to be braked notwithstanding full release of the braking force from the actuating rod.

2. A brake assembly as claimed in claim 1, further characterized in that said biasing means exerts such a thrust on said brake head as to cause said brake shoe carried thereby to be pressed against the rotatable member, while no force is applied to said actuating rod, with adequate force to effect, by the friction of said brake shoe against the rotatable member to be braked, the generation of sufficient heat to maintain said brake shoe and the braking surface of the rotatable member to be braked at such a temperature as to prevent the formation of ice thereon.

3. A brake assembly as claimed in claim 1, further characterized in that said lost motion connection providing means comprises:
    (a) means on said actuating rod having a slot therein,
    (b) a pin carried by the brake head and slidably movable in the said slot, and
    (c) a follower member slidably movable in the said slot at one side of said pin, said biasing means being spring means interposed between the said follower member and the actuating rod so as to exert a force urging the brake head and brake shoe carried thereby into frictional contact with the member to be braked through said follower member and pin.

4. A brake assembly as claimed in claim 3, further characterized in that said actuating rod is provided with a recess opening out of said slot for receiving said spring means therein.

5. A brake assembly as claimed in claim 3, further characterized in that the slot in said means on the actuating rod is open at the end thereof, and said means has at the open end of the slot a pair of oppositely disposed and inwardly extending fingers to prevent movement of said pin out of the open end of said slot.

References Cited by the Examiner
UNITED STATES PATENTS

| | | |
|---|---|---|
| 384,507 | 6/88 | Brown. |
| 943,730 | 12/09 | Beatty _____ 188—217 |
| 2,940,553 | 6/60 | Newell et al. _____ 188—202 X |

ARTHUR L. LA POINT, *Primary Examiner.*

DUANE A. REGER, *Examiner.*